United States Patent
Karlsson

(10) Patent No.: US 9,389,832 B2
(45) Date of Patent: Jul. 12, 2016

(54) EXPERIENCE LOG

(71) Applicant: SONY MOBILE COMMUNICATIONS AB, Lund (SE)

(72) Inventor: David Karlsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 13/654,501

(22) Filed: Oct. 18, 2012

(65) Prior Publication Data

US 2014/0114917 A1 Apr. 24, 2014

(51) Int. Cl.
*G06F 7/00* (2006.01)
*G06F 17/30* (2006.01)
*G06F 11/30* (2006.01)

(52) U.S. Cl.
CPC *G06F 7/00* (2013.01); *G06F 11/30* (2013.01); *G06F 17/30064* (2013.01); *G06F 17/30994* (2013.01)

(58) Field of Classification Search
None
See application file for complete search history.

(56) References Cited

U.S. PATENT DOCUMENTS

| | | | | |
|---|---|---|---|---|
| 7,143,353 B2 * | 11/2006 | McGee et al. | | 715/723 |
| 7,248,777 B2 * | 7/2007 | Feininger et al. | | 386/241 |
| 7,320,137 B1 * | 1/2008 | Novak et al. | | 725/134 |
| 7,350,704 B2 | 4/2008 | Barsness et al. | | |
| 2005/0160113 A1 * | 7/2005 | Sipusic | | G06F 3/0485 |
| 2007/0244903 A1 * | 10/2007 | Ratliff et al. | | 707/10 |
| 2007/0266305 A1 * | 11/2007 | Cong | | G06Q 30/02 715/700 |
| 2007/0297618 A1 * | 12/2007 | Nurmi | | H04R 1/1041 381/71.6 |
| 2008/0126919 A1 * | 5/2008 | Uskali et al. | | 715/200 |
| 2008/0294663 A1 * | 11/2008 | Heinley | | G06F 3/0481 |
| 2009/0070798 A1 * | 3/2009 | Lee | | A61B 5/1113 725/10 |
| 2010/0076274 A1 * | 3/2010 | Severson | | 600/300 |
| 2011/0138432 A1 * | 6/2011 | Mitra et al. | | 725/109 |

OTHER PUBLICATIONS

Junzo Kamahara et al: "Method for Identifying Task Hardships by Analyzing Operational Logs of Instruction Videos", Dec. 2, 2009, Semantic Multimedia, Springer Berlin Heidelberg, Berlin, Heidelberg, pp. 161-164, XP019135184, ISBN 978-3-642-10542-5.
International Search Report dated Aug. 12, 2014, issued in corresponding PCT application PCT/IB2013/002323, 11 pages.

* cited by examiner

*Primary Examiner* — Michael Hicks
(74) *Attorney, Agent, or Firm* — Tucker Ellis LLP

(57) ABSTRACT

A device may play a content item and detect an event while the content item is playing. The device may also determine a position, within the content item, at which the content item is playing when the event is detected, to obtain position information. In addition, the device may associate the position information with information obtained based on the event to generate a log entry. The device may update an experience log with the log entry.

14 Claims, 7 Drawing Sheets

EXPERIENCE LOG

BACKGROUND

Advances in communication, network, and computer technology are allowing consumers to access many types of media with increasing ease. For example, it is common for a user to download a video to the user's smart phone and view the video with little delay, or for a user to read an e-book stored at a remote device without waiting a long time for the e-book to load.

SUMMARY

According to one aspect, a device may include a memory to store instructions and a processor. The processor may execute the instructions to: play a content item; detect an event at an end of a portion, of the content item, that has been played; determine a position, within the content item, of the end of the portion, to obtain position information; obtain engagement information that indicates a user's level of engagement with the content item based on information about the event; associate the position information with the engagement information and information identifying the portion to generate a log entry; and update an experience log with the log entry.

Additionally, the content item may include an audio content item, a video content item, or an electronic book.

Additionally, the content item may include an electronic book. The information about the event may indicate at least one of: how many times a page of the electronic book has been displayed; how many times a sentence in a page of the electronic book has been displayed; how long a user has been looking at a page of the electronic book; how long a user has been looking at a sentence of the electronic book; and how long a page of the electronic book has been displayed.

Additionally, the content item may include an electronic book. The information about the event may indicate at least one of: how many times a page of the electronic book has been displayed; how long a user has been looking at a page of the electronic book; and how long a page of the electronic book has been displayed.

Additionally, the content item may include one of an audio content item and a video content item. The information about the event may indicate at least one of: how many times a segment of the content item has been replayed; a volume level at which the content item is played; whether a user is wearing headphone; whether a user is looking at a display; or whether a user fast forwards over another portion of the content item.

Additionally, the device may include a smart phone, a laptop computer, a game console, a tablet computer, compact disc (CD) player, or a digital video disc (DVD) player.

Additionally, when the processor associates the position information with the engagement information, the processor may further execute the instructions to associate the position information with the information identifying the portion and information about a component that generated the event.

Additionally, the device may further include a network interface. When the processor updates the experience log, the processor may further execute the instructions to send the log entry to a network device via the network interface.

Additionally, the device may further include a network interface. The processor may be further configured to execute the instructions to: download the content item from a first device via the network interface; or download the experience log from either the first device or a second device.

Additionally, the processor may be further configured to execute the instructions to receive user input indicating a position on a graphical component representing the experience log, the graphical component being displayed via the device.

Additionally, the processor may be further configured to execute the instructions to one of: play the content item starting at a location, within the content item, corresponding to the position on the graphical component; or display information in an entry, from the experience log, whose position information matches the position on the graphical component.

According to another aspect, a method may include playing a content item; detecting an event while the content item is playing; determining a position, within the content item, at which the content item is playing when the event is detected, to obtain position information; associating the position information with information obtained based on the event to generate a log entry; and updating an experience log with the log entry.

Additionally, the content item may include an audio book, an electronic book, or a video.

Additionally, the content item may include an electronic book. The information may indicate how many times a user has viewed each page of the electronic book; how many times a user has viewed a sentence in a page of the electronic book; how long a user has been looking at each page of the electronic book; how many times a user has been looking at each sentence of the electronic book; and how long each page of the electronic book has been displayed.

Additionally, the content item may include an audio book. The information may indicates at least one of: how much time a user spent on a segment of the audio book; how many times a segment of the audio book has been replayed; a volume level at which the audio book is played; whether a user is wearing headphone or ear buds while the audio book has been playing; or whether a user has fast forwarded over another portion of the audio book.

Additionally, the associating the position information with the information obtained based on the event may include combining the position information and an identifier for a component that generated the event.

Additionally, updating the experience log may include sending the log entry to a network device that updates the experience log with the log entry.

Additionally, the method may further include downloading the content item from a network device; and downloading the experience log either from the network device or from another device.

Additionally, the method may further include receiving user input indicating a position on a graphical user interface, which represents the experience log that is displayed to a user.

Additionally, the method may further include: playing the content item starting at a location, within the content item, corresponding to the position on the graphical component; or displaying information in an entry, from the experience log, whose position information identifies the position on the graphical component.

According to yet another aspect, a computer-readable storage device may include computer executable instructions. The computer-executable instructions, when executed by a processor, cause the processor to: download a content item to a device; play the content item at the device; detect an event at an end of a portion, of the content item, that was played; determine a position, within the content item, of an end of the portion when the event is detected, to obtain position information; associate the position information with information obtained based on the event, and information identifying the portion, to generate a log entry; and update an experience log with the log entry.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

Figure 1:
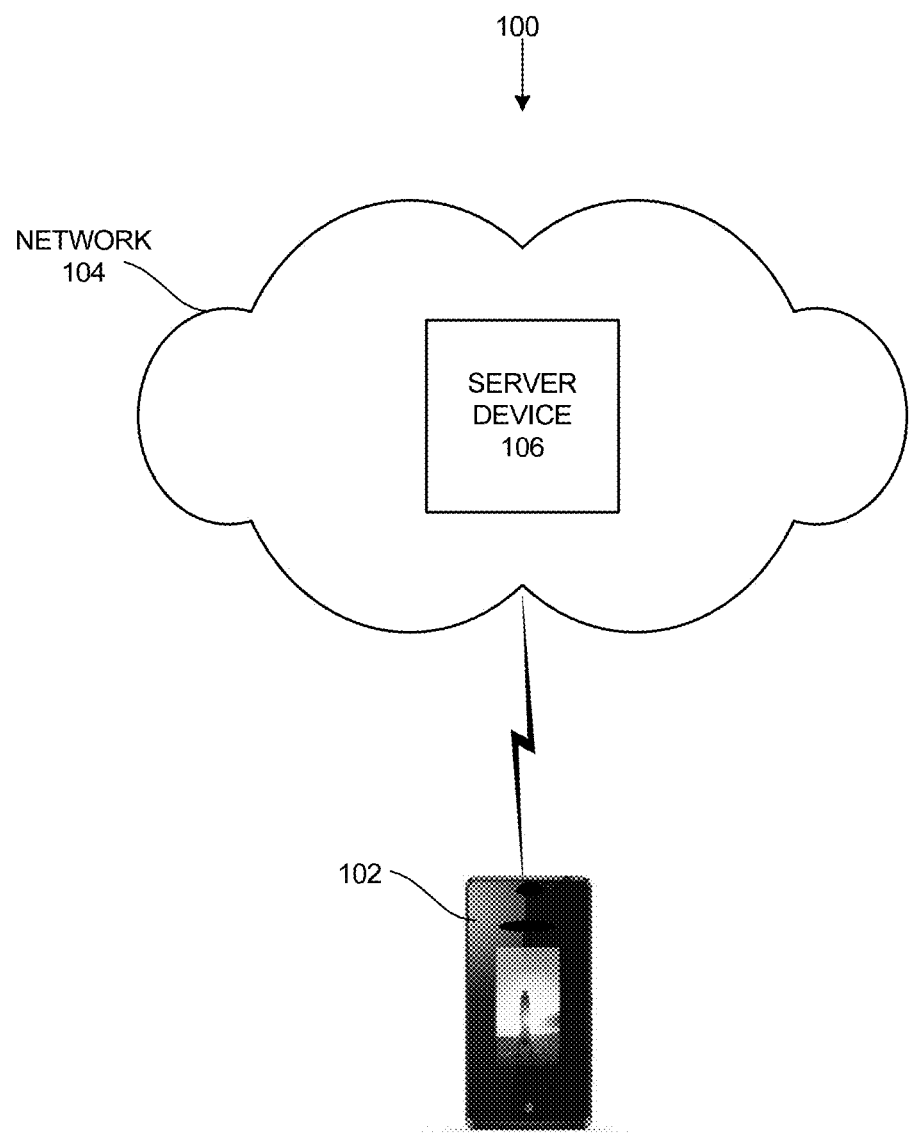
FIG. 1 is a diagram of an exemplary network in which concepts described herein may be implemented.

The following detailed description refers to the accompanying drawings. The same reference numbers in different drawings may identify the same or similar elements.

As used herein, the term "playing" may refer to processing, by an application, to provide an output based on a portion of a content item for observation or consumption by a user. For example, an e-book application may play an e-book (e.g., display pages of an e-book in accordance with user controls); a media player may play an audio content item (e.g., an audio book, a song, a piece of music, etc.); a video player may play a movie; etc.

As used herein, the term "position information" or "location information" may refer to an alphanumeric value(s) that identifies a particular point in a content item. For example, a time value (e.g., 5 minutes), when used as position information in an audio/video content item, may designate a point, in the audio/video content item, that a content player would reach after playing the audio/video content item from the start at the normal speed, for the duration of the time value. In another example, a page number may refer to a point in an e-book.

In the following, a time value or a page number may refer to a portion or a segment of a content item (e.g., a page's worth of content in an e-book at the page number or a time value's worth of audio/video material in an audio/video content item, etc.). Such a use of a time value or a page number is distinguished from its use as location or position information in a content item.

One typical feature of physical books is that it is easy to mark the location where a user stopped reading. If the user somehow loses a bookmark, the user may flip through the physical book and find the correct page (and/or the line or the sentence in the page) to resume reading. This does not work as well with an e-book, an audio content item, a video content item, or another form of electronic media.

In an e-book, without an "e-bookmark," for example, a user may easily lose track of the location of the last page read. For example, a user may flip through hundreds of pages in the e-book with a wrong flick of a finger (or through minutes worth of content in audio/video content item with a wrong push of the fast forward button). Given an e-book with many embedded links, a user may become completely lost after accidentally activating a link within the e-book and flicking a finger over some pages.

In addition, not only is getting lost in e-books easier than it is in physical books, but the penalty for getting lost is greater with e-books. Returning to a particular page in a physical book is easier than that in an e-book, as browsing through a physical book is easier (probably because a user has a better control over browsing the physical book). Getting lost in an e-book several times may ruin the fun of reading the e-book, to the extent that the user may no longer want to finish the e-book.

In the following, when a user accesses a content item (e.g., listens to/views an audio/video content item, reads an e-book, etc.), a system may generate or update an experience log to aid the user in subsequently re-establishing the user's orientation/location within the content item. When the user is lost, the use may use the experience log to reorient oneself within the content item.

As described herein, to generate an experience log for a content item, when a user plays the content item, the system may collect one or more sets of information about the user (e.g., via input from the application that plays the content item, via input from a camera, via input from different types of sensors (e.g., microphone), etc.). Furthermore, the system may associate each set of information with a relative location, within the content item, and aggregate the associations to generate an experience log.

FIG. 1 is a diagram of an exemplary network 100 in which concepts described herein may be implemented. As shown, network 100 may include a user device 102 and network 104. Network 104, in turn, may include other devices, such as server device 106.

User device 102 may include any of the following devices that have the ability to, or are adapted to, display images and/or provide an audio/video output: a smart phone; a tablet computer; a cell phone or a mobile telephone with a display (e.g., smart phone); a mobile Internet device; an electronic notepad; a gaming console; a laptop; a personal computer; a personal digital assistant (PDA); a peripheral (e.g., wireless display, etc.); a digital camera; or another type of computational or communication device.

User device 102 may play a content item, obtained from a local storage, an input device (e.g., a disc player), a server device, etc. When user device 102 plays the content item, user device 102 may generate, store, and display an experience log. In some implementations, user device 102 may generate an experience log and store the experience log at server device 106. In these implementations, when user device 102 requests a content item from server device 106, server device 106 may also provide user device 102 with an experience log that is associated with the content item and associated with user device 102 (or associated with a user of user device 102).

Network 104 may include a cellular network, public switched telephone network (PSTN), local area network (LAN), wide area network (WAN), a wireless LAN, metropolitan area network (MAN), Internet Protocol (IP) based High Speed Packet Access (HSPA) network, evolved HSPA network, Long Term Evolution (LTE) network, intranet, the Internet, satellite-based network, a fiber-optic network (e.g., passive optical networks (PONs)), an ad hoc network, any other network, or a combination of networks. Devices that are shown in FIG. 1 may connect to network 104 via wireless, wired, or optical communication links. Although not illustrated, network 104 may include other devices and/or components, such as routers, bridges, gateways, switches, etc.

As shown in FIG. 1, network 104 may include a server device 106. Server device 106 may provide content items to user device 102. In some implementations, server device 106 may receive log entries from user device 102 and store the entries in corresponding experience logs. In these implementations, when server device 106 receives a request from user device 102 to send a content item over network 104, server device 106 may also send an experience log associated with user device 102 and the content item to user device 102.

The number and types of devices in FIG. 1 are exemplary. Depending on the implementation, network 100 may include additional, fewer, different, or a different arrangement of components than those illustrated in FIG. 1. For example, network 100 may include thousands, millions, etc., of user devices and server devices. Furthermore, although not illustrated, network 100 may include other types of devices and components, such as routers, switches, bridges, gateways, etc.

Figures 2A, 2B:
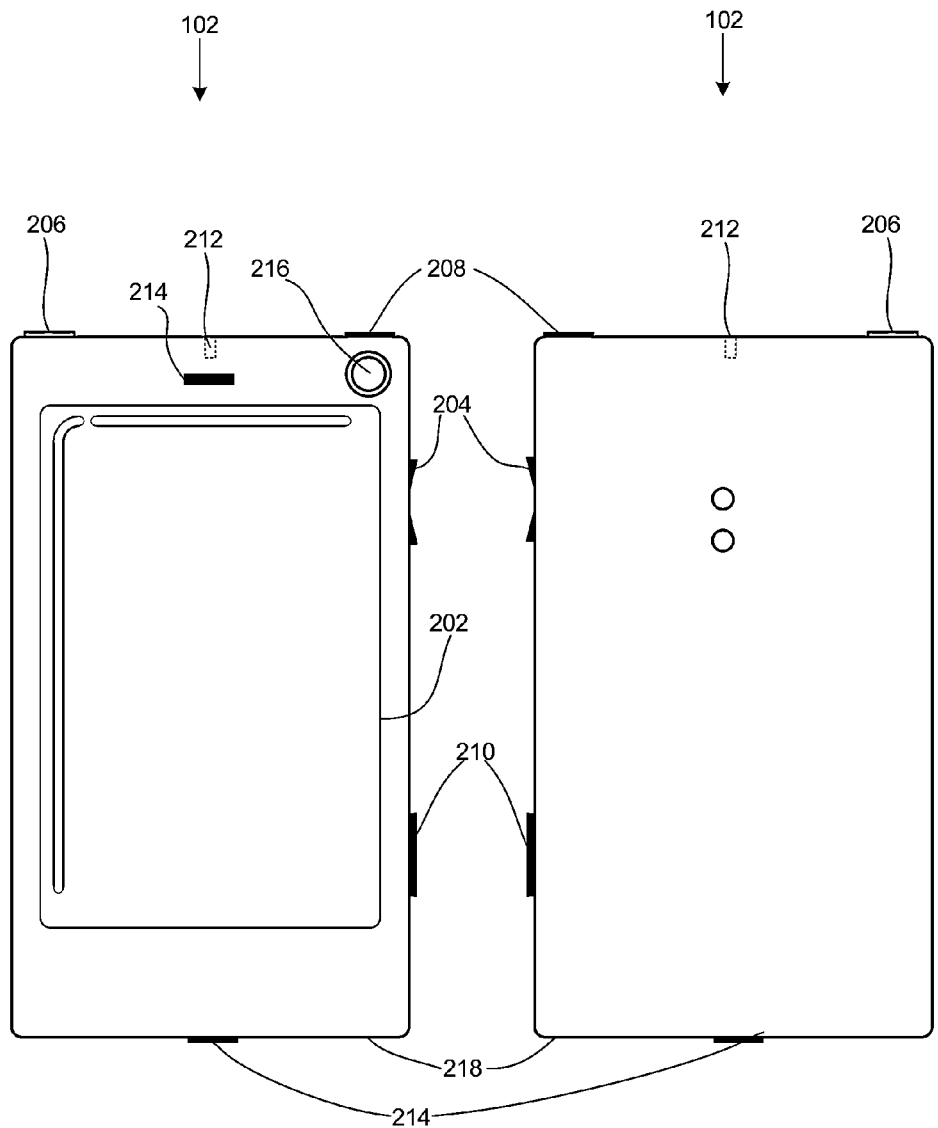
FIGS. 2A and 2B are front and rear views of an exemplary user device of FIG. 1.

FIGS. 2A and 2B are front and rear views of one implementation of user device 102. As shown in FIGS. 2A and 2B, user device 102 may include a display 202, volume rocker 204, awake/sleep button 206, a data/charging port 208, camera button 210, speaker jack port 212, microphone/speaker 214, camera 216, and housing 218. Depending on the implementation, user device 102 may include additional, fewer, different, or different arrangement of components than those illustrated in FIGS. 2A and 2B.

Display 202 may provide visual information to the user. Examples of display 202 may include a liquid crystal display (LCD), a plasma display panel (PDP), a field emission display (FED), a thin film transistor (TFT) display, etc. In some implementations, display 202 may also include a touch screen that can sense contacting a human body part (e.g., finger) or an object (e.g., stylus) via capacitive sensing, surface acoustic wave sensing, resistive sensing, optical sensing, pressure sensing, infrared sensing, and/or another type of sensing technology. The touch screen may be a single-touch or multi-touch screen.

Volume rocker 204 may permit a user to increase or decrease speaker volume. In some implementations, user device 102 may sense volume rocker 204's setting, and provide a numerical value associated with the setting to device 102 for generating an experience log. Awake/sleep button 206 may put user device 102 into or out of the power-savings mode. In some implementations, awake/sleep button 206 may be replaced by an on/off button that turns user device 102 on or off.

Data/charging port 208 may allow user device 102 to communicate over, for example, universal serial bus (UBS), to another device. In some implementations, data/charging port 208 may also allow user device 102 to receive power, either from an adapter (e.g., an alternating current (AC) to direct current (DC) converter) or from another device (e.g., computer). Camera button 210 may send a signal to camera 216 to capture an image (e.g., cause a shutter to open/close).

Speaker jack port 212 may include a plug-in into which one may insert a speaker jack, so that signals from user device 102 can drive the speakers, to which speaker wires run from the speaker jack. In some implementations, a pair of headphones (or ear buds) whose speaker jack is inserted into speaker jack port 212 may be capable of sensing whether the headphones/earphones/ear buds are being used (e.g., whether the headphones are on the user's head, whether the ear buds are inserted into the user's ears, etc.). In addition, the headphones/earphones/ear buds may relay information obtained from the sensing to user device 102 via speaker jack port 212. Accordingly, user device 102 may use the information in generating an experience log.

Microphone/speaker 214 may receive audible information and/or sounds from the user and from the surroundings. In addition microphone/speaker 214 may provide audible information from user device 102 to the user. User device 102 may use the information from microphone/speaker 214 in generating the experience log.

Front camera 216 may enable the user to view, capture, store, and process images of a subject in/at front of camera 216. In some implementations, a software application installed on user device 102 may receive an image of the user's eyes via front camera 216, identify the direction of the user's gaze, and obtain information indicating whether user is looking at display 202. User device 102 may use the information in generating an experience log. Housing 218 may provide a casing for components of user device 102 and may protect the components from outside elements.

Depending on the implementation, user device 102 may include additional, fewer, different, or a different arrangement of components than those illustrated in FIGS. 2A and 2B. For example, user device 102 may include sensors to collect and provide, to user device 102, information pertaining to user device 102 (e.g., movement, orientation, etc.) and/or information that is used to aid a user in capturing images (e.g., for providing information for auto-focusing). Furthermore, although not illustrated, user device 102 may include additional components, such as flash lights, light emitting diodes (LEDs), etc.

Figure 3:
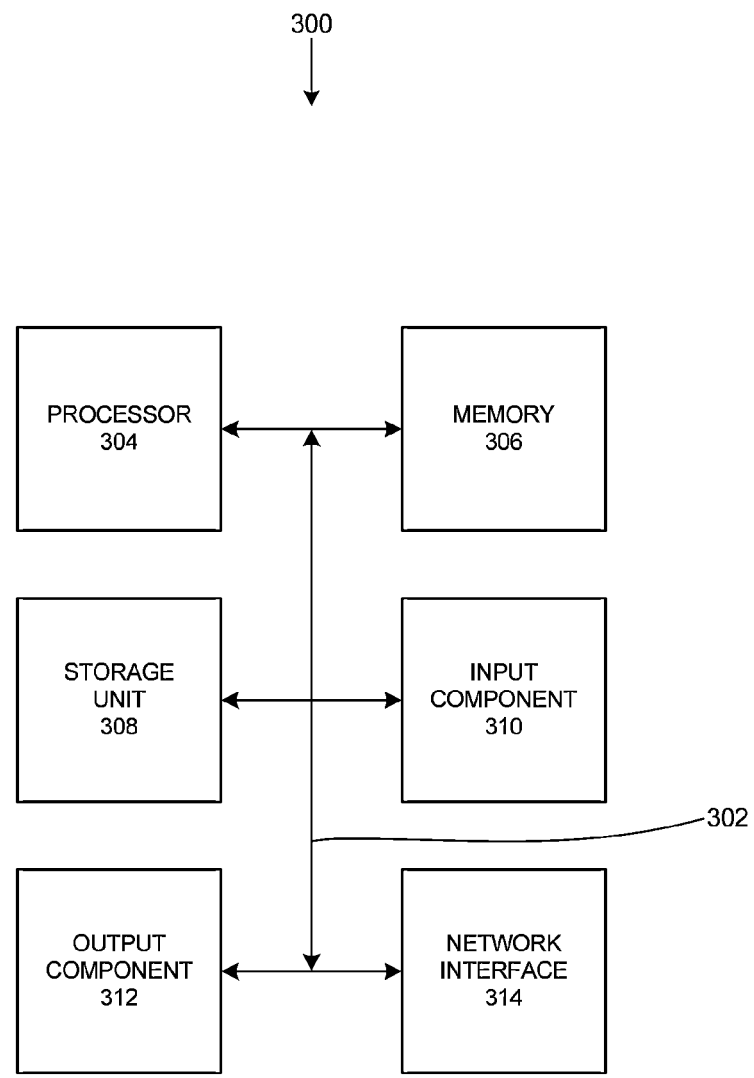
FIG. 3 is a block diagram of exemplary components of a network device of FIG. 1.

FIG. 3 is a block diagram of network device 300. Network device 300 may represent user device 102 or server device 106. As shown, network device 300 may include a communication path 302, processor 304, memory 306, storage unit 308, input component 310, output component 312, and network interface 314. In different implementations, network device 300 may include additional, fewer, or different components than the ones illustrated in FIG. 3.

Communication path 302 may provide an interface through which components of network device 300 can communicate with one another. Processor 304 may include a processor, a microprocessor, an Application Specific Integrated Circuit (ASIC), a Field Programmable Gate Array (FPGA), and/or other processing logic capable of controlling network device 300. Memory 306 may include static memory, such as read only memory (ROM), and/or dynamic memory, such as random access memory (RAM), or onboard cache, for storing data and machine-readable instructions.

Storage unit 308 may include a magnetic and/or optical storage/recording medium. In some embodiments, storage unit 308 may be mounted under a directory tree or may be mapped to a drive. Depending on the context, the term "medium," "memory," "storage," "storage device," "storage medium," and/or "storage unit" may be used interchangeably. For example, a "computer readable medium,""computer-readable storage device" and "computer readable storage medium" may refer to both a memory and/or storage device.

Input component 310 may permit a user to input information to network device 300. Input component 310 may include, for example, a keyboard, a keypad, a mouse, a pen, a microphone, a camera, a touch screen, voice recognition and/or biometric mechanisms, sensors, etc. Output component 312 may output information to the user. Output component 312 may include, for example, a display, a printer, a speaker, etc.

Network interface 314 may include a transceiver that enables user device 102 to communicate with other devices and/or systems. For example, network interface 314 may include mechanisms for communicating via a network, such as the Internet, a mobile network, a terrestrial wireless network (e.g., a WLAN), a satellite-based network, a personal area network (PAN), a WPAN, etc. Additionally or alternatively, network interface 314 may include a modem, an Ethernet interface to a LAN, and/or an interface/connection for connecting network device 300 to other devices (e.g., a Bluetooth interface).

Figure 4:
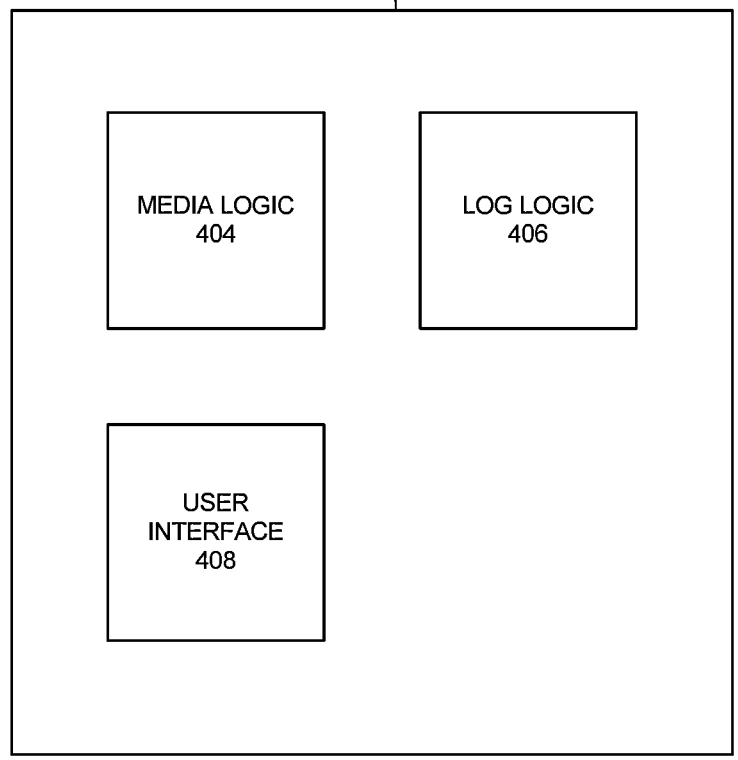
FIG. 4 is a block diagram of exemplary functional components of the user device of FIG. 1.
Figure 4:
Figure 4:

FIG. 4 is a block diagram of exemplary functional components of user device 102. As shown, user device 102 may include: a content application 402, which may include media logic 404, log logic 406, and a user interface 408; sensor logic 410; a content items database 412; and an experience log database 414. Depending on the implementation, user device 102 may include additional, fewer, different, or different arrangement of components than those illustrated in FIG. 4. For example, user device 102 may include an email client application, a text messaging application, a phone application, etc.

Content application 402 may play a content item. Furthermore, content application 402 may generate and use experience logs. Media logic 404 may receive a user selection of a content item (e.g., via user interface 408) and play the content item in accordance with user inputs (e.g., fast forward, rewind, etc.). In addition, media logic 404 may provide, to log logic 406, parameters that indicate a level of user's engagement E with the content item. For example, if a user fast forwards through a portion of a content item, media logic 404 may indicate, to log logic 406, the fast forwarding. In another example, if the user replays the portion, the media logic 404 may indicate the number of times that the user replayed the portion (e.g., how many times a portion of audio/video content item (e.g., audio book, a piece of music, movie, advertisement, etc.) has been replayed or viewed by a user, how many times a page or a sentence of an electronic book has been displayed or viewed, how long a page of an electronic book has been displayed, etc.).

Log logic 406 may open an experience log related to a content item accessed via media logic 404, display the experience log (e.g., via user interface 408), receive user input to functions related to the experience log, and perform the functions (e.g., log user experience).

When media logic 404 accesses a content item, log logic 406 may attempt to obtain, either from server device 106 or from experience log database 414, a corresponding experience log that is associated with the content item and with user device 102. If no corresponding experience log exists, log logic 406 may create a new experience log in experience log database 414 or at server device 106.

When media logic 404 plays the content item, log logic 406 may obtain, from media logic 404, information identifying the location, within the content item, of the portion of the content item being played. In addition, log logic 406 may obtain the engagement information E that indicates the level of user's engagement with the content item (e.g., how much the user is paying or has paid attention to the content item) based on information from media logic 404 and from sensor logic 410, described below.

In some implementations, information E may represent a score (e.g., a number in a range, such as 1-10). For example, if a volume level for a video is set high, log logic 406 may determine that the engagement level associated with the video is 7. Furthermore, in these implementations, log logic 102 may determine E based on one or multiple sources of information. For example, log logic 406 may determine E based on both whether the user is gazing at the display of user device 102 and whether a volume for a video content item is set high. Assume that, in such a case, the user is looking away from user device 102 and the volume is set high, and that the level of engagement is 5. This would be higher than the level of engagement for a situation in which the volume is low and the user is looking away from user device 102 (e.g., E of 2), but lower than the level of engagement for a situation in which the user is both looking at the display and the volume is high (e.g., E of 9).

Log logic 406 may associate the location information with the engagement information E, information identifying the portion for which E applies, and additional information (e.g., an identifier of the source of information from which E is obtained, a time when E is generated, etc.) and then store the association in the experience log in experience log database 414.

In some implementations, user device 102 may not include multiple experience logs, each for a different content item (e.g., in experience log database 414), but a single experience log for all content items. In such an implementation, log logic 406 may associate an identifier for the content item (e.g., a hash of the content item) with the E, the location information, time information, information identifying the physical location of user device 102, etc. Log logic 406 may store the association as an entry in the experience log. In such implementations, log logic 102 may scan through the entire log to identify log entries that pertain to a specific content item, for user device 102 to display a graphical user interface component corresponding to log entries for the content item.

Log logic 406, in response to user input, may provide information related to an experience log to the user (e.g., via user interface 408). For example, assume that a content item is an e-book. When a user identifies or selects (e.g., via a cursor or via a touch screen) a particular point on a graphical representation of an experience log, log logic 406 may provide information about a portion, of the content item, associated with the point, such as a page number (or a sentence or a line number in the page) associated with the portion, a text block quoting the portion, etc. In another example, assume that a content item is an audio content item. When a user identifies or selects a particular point on a graphical representation of an experience log, log logic 406 may replay a small portion, of the item, associated with the point (e.g., via media logic 404). When the user activates the particular point (e.g., via a mouse click, double tap on the point, etc.), log logic 406 may cause media logic 404 to display and/or play the content item starting at the portion associated with the activated point.

User interface 408 may receive user input related to playing content items and functions related to experience logs. Providing input to content application 402 via user interface 408 may result in the execution of media logic 404 or log logic 406.

In some implementations, content application 402 may obtain user-requested content items and/or experience logs from a local storage (e.g., from content items database 412 and experience log database 414), respectively. When an experience log is created and/or updated, content application 402 may store or update the experience log in the local storage.

In other implementations, content application 402 may obtain user requested content items and corresponding experience logs from server device 106, via network 104. When an experience log is created and/or updated, content application 402 may store or update the experience log at server device 106.

Sensor logic 410 may provide information from sensors or sensor-like devices/components (either software or hardware components) of user device 106. For example, sensor logic 410 may provide information that indicates whether a user is wearing the headphones or earphones, whether ear buds are inside the user's ears, whether the user is touching display screen 202 when display screen 202 is showing particular pages/sentences, a volume level at which a content item is played, etc. In some implementations, sensor logic 410 may determine whether the user is looking at or how long the user is looking at the display (or a window for playing the content item) of user device 102, by analyzing the images of the user's eyes, captured by a front camera 216, for example. Based on the information, log logic 406 may the engagement information E.

Content items database 412 may include a local copy of content items. In some implementations, content items database 412 may cache content items.

Experience log database 414 may include one or more logs that are associated with content items that are being played or have been played by media logic 404. In some implementations, each experience log in experience log database 414 may be associated with a particular content item, and may include a number of entries. Each entry may include: information identifying a location within a content item; engagement information E corresponding to the location; information identifying a portion, of the content item, to which the information E applies; and an identifier(s) for the sources (e.g., headphone sensor, speaker volume sensor, camera, a component in media logic 404, etc.) of information from which the engagement information E is obtained.

As described above, in other implementations, in place of experience log database 414, user device may include a single experience log for multiple content items. In such implementations, each entry in the log may also include: information identifying a content item (e.g., a hash of the content item); information identifying a location within the content item; engagement information E corresponding to the location; information identifying a portion, of the content item, to which the information E applies; an identifier(s) for the source(s) (e.g., headphone sensor, speaker volume sensor, camera, a component in media logic 404, etc.) of information from which the engagement information E is obtained, etc.

Depending on the implementation, the information identifying a portion within a content item may be in one of many different formats. For example, in one implementation, the information may include an amount (or a size) of the portion (e.g., 3 pages, three sentences, 2 paragraphs, 10 minutes worth of video/audio material, etc.) and a location of one of the end points (e.g., the start or the end). More specifically, for example, a portion of an e-book may be identified by: , which may indicate that the portion starts at the beginning of page 3, and the portion includes 3 lines. In another implementation, the information includes the end points of a portion that spans some material in the content item. More specifically, for example, a portion of a video content item may be identified by: <10:35 11:34>, which indicates the starting point of a video portion, relative to the start of the video content item and the end point of the video portion.

Figure 5:
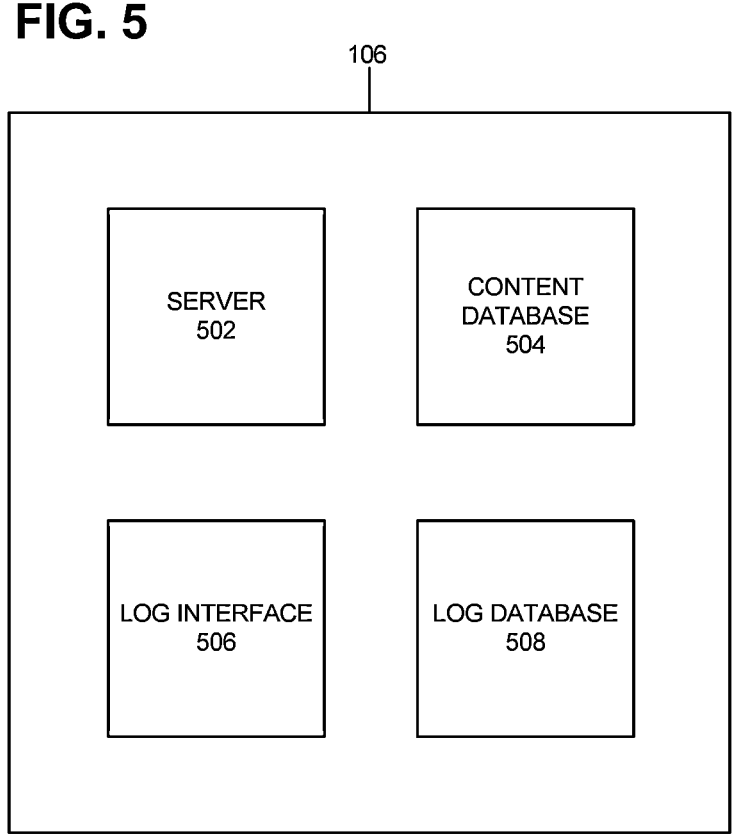
FIG. 5 is a block diagram of exemplary functional components of the server device of FIG. 1.

FIG. 5 is a block diagram of exemplary functional components of a server device 106. As shown, server device 106 may include a server 502, content database 504, a log interface 506, and a log database 508. Depending on the implementation, server device 106 may include additional, fewer, different, or a different arrangement of components than those illustrated in FIG. 5. For example, in some implementations, server device 106 may not include content 504.

Server 502 may be implemented as an application server or a web server, and may provide content items in content database 504 and experience logs in log database 508 to user devices (e.g., user device 102). In addition, server 502 may receive experience logs or updates to experience logs. Server 502 may store or update experience logs in log database 508.

Content database 504 may include content items. As indicated above, the content items may include audio/video content items, e-books, web documents (e.g., web pages, portable document format (PDF) documents, etc.), etc.

Log interface 506 may read, store, and/or update experience logs in log database 508 on behalf of server 502. Log database 508 may include one or more experience logs. Each experience log in log database 508 may be associated with a specific content item and a specific user or a user device.

Figure 6:
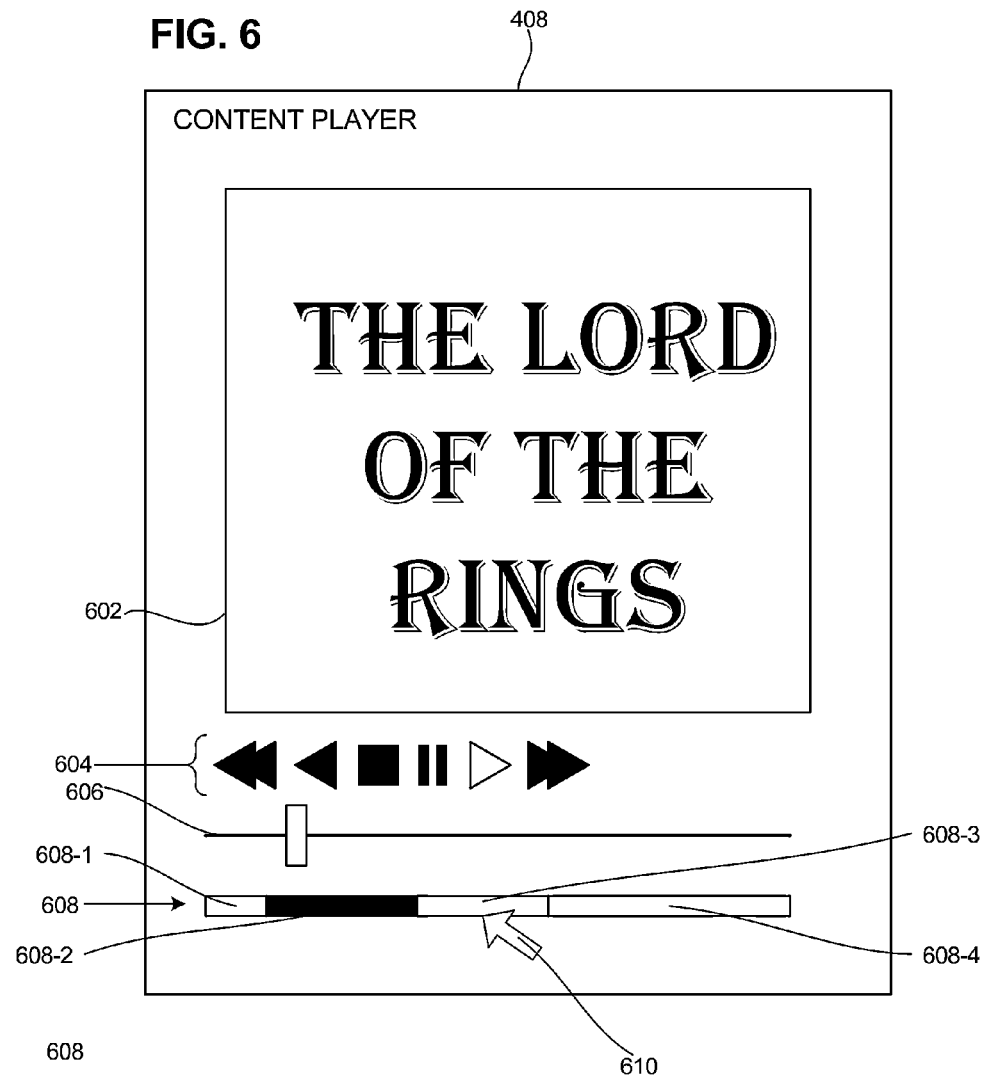
FIG. 6 illustrates an exemplary user interface displayed by the user device of FIG. 1.

FIG. 6 illustrates a view of user interface 408 displayed by user device 102. Assume that in FIG. 6, an audio book has been loaded into content application 402, which includes user interface 408. As shown, user interface 408 may include a display window 602, control buttons 604, a track bar 606, and an engagement level bar 608. Depending on the implementation and views, user interface 408 may include additional, fewer, different, or a different arrangement of components than those illustrated in FIG. 6.

Display window 602 may show illustrations and/or information that is associated with the content item or a portion of the content item being played by content application 402. For example, display 602 may show images that are associated with a portion, of an audio/video content item.

Control buttons 604 may allow a user to provide signals for playing a content item and/or controlling trick plays (e.g., fast forward, rewind, reverse, pause, etc.). If a different type of content item is loaded on content application 402, in place of control buttons 604, user interface 408 may show a different set of control components.

Track bar 606 may show the current location, in the content item loaded on content application 402, of a portion of the content item being played by content application 402.

Engagement level bar 608 may show levels of user's engagement/attention on the content item being played by content application 102. As illustrated, engagement level bar 608 may include portions 608-1 through 608-4 (individually referred to as "portion 608"). Each portion 608 may visually indicate a different level of user's engagement (e.g., via different colors). For example, portion 608-2, being the darkest portion, may indicate the highest levels of user's engagement with the content item (e.g., E of 4 or 5 in the range of 1-5). In contrast, portion 608-4, which is the lightest portion, may indicate that the user has not listened to the corresponding portion the content item (e.g., E of 0 or 1 in the range of 1-5). The number of portions may depend on the number of times the user changes the user's level of engagement while the content item is played by content application 402.

In addition to illustrating different levels of user's engagement, depending on the implementation, engagement level bar 608 may provide additional functionalities to the user. For example, if a user moves a cursor 610 (or user's finger on a touch screen) over engagement bar 608, additional information related to the portion pointed by cursor 610 may be provided by content application 402. For example, content application 402 may display, near cursor 610, the logged information (e.g., which of control buttons 604 the user pressed, head phones were removed from the user's head, the volume level, etc.).

EXEMPLARY PROCESS

Figure 7:
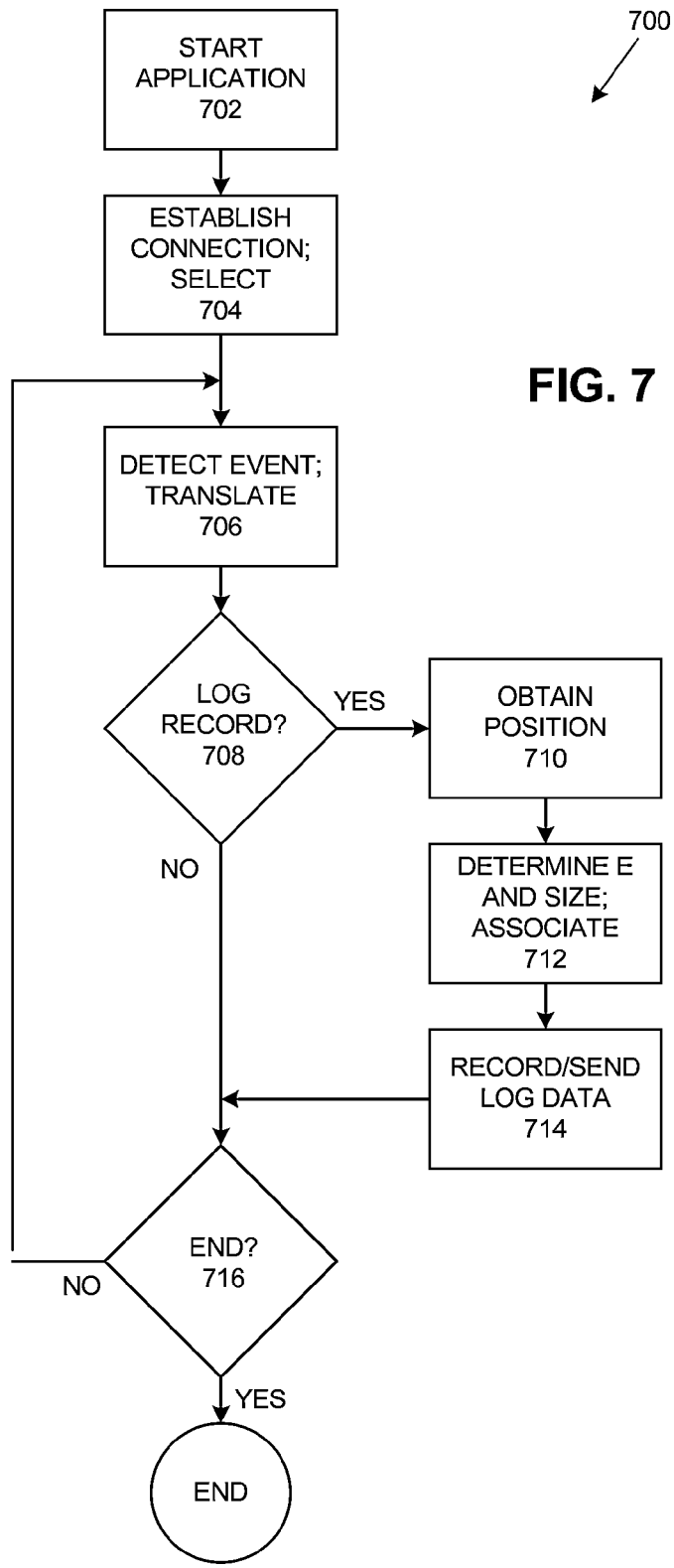
FIG. 7 is a flow diagram of an exemplary process that is associated with the user device of FIG. 1.

FIG. 7 is a flow diagram of an exemplary process 700 that is associated with user device 102. As shown, process 700 may include starting content application 402 (block 702). In some implementations, user device 102 may connect to server device 106, to request a content item selected by a user (block 704). In other implementations, content application 402 may obtain a local copy (e.g., via a DVD/CD ROM, local hard drive, etc.) of the content item selected by a user.

Content application 402 may detect an event related to content application 402 (block 706). An event may include, for example, activating one of control buttons 604, detecting output from a camera (e.g., image of the user's eyes), detecting whether head phones are worn or taken off by the user, a change in the volume set on user device 102, etc.

Content application 402 may determine whether the event should generate a log record (e.g., determine whether the event indicates a level of user's engagement with the content item) (block 706). For example, if the event is the user taking off a set of headphones, content application 402 may determine that the event indicates decreased level of user's engagement with the content item, and that a corresponding log record needs to be generated.

If content application 402 determines that the event is to generate a log record (block 708: yes), content application 402 may obtain information indicating a relative location/position at which the content is being played (block 710). The position/location information may include a page or paragraph number (with a line number, or a sentence number), time duration (length of time) for an audio/video content item, a paragraph number, etc.

In addition to obtaining the position/location, content application 402 may generate information E (block 712), based on information about the event, that indicates a level of user's engagement with a portion the content item. Content application 402 may also obtain information identifying a portion, of content item, that has been played at the determined E. For example, based on the event that the user fast forwards an audio book from the 12:00 minute mark to the 15 minute mark, content application may 402 may determine that the user's level of engagement from the 12:00 minute mark to the 15 minute mark is zero. Content application 402 may then associate the information E with the information identifying the portion, and the position/location information (block 712). In some implementations, content application 402 may associate information E with the position/location information, the information identifying the portion, information about the event (e.g., a source of the event (e.g., an identifier for the component), a time of the event, etc.), and additional information (e.g., a hash of the content item).

Content application 402 may record/store the association (block 714). Depending on the implementation, rather than storing the association locally, content application 402 may send the association over network 104 to server device 106, which may record the association, for the content item and user device 102 in log database 508. Process 700 may proceed to block 716.

Returning to block 708, if content application 402 determines that the event is not to generate a log record (block 708: no), process 700 may proceed to block 716. At block 716, content application 402 may determine whether the user is finished with the content item (e.g., the user activated a close button) (block 716).

If the user is not done with the content item (block 716: no), process 700 may return to block 706. Otherwise, process 700 may terminate.

In some implementations, content application 402 may not send associations between information E, information identifying positions, in content item, at which E was obtained, information identifying the portions, and/or identifiers of the sources of information from which E is obtained to server device 106 in real time. Instead, content application 402 may send the associations at selected times (e.g., every 5 minutes, when the user closes the content item, etc.).

EXAMPLE

The following example, with reference to FIG. 6, illustrates process 700. Assume that David wishes to listen to an audio book "The Lord of the Rings." On user device 102 (e.g., a tablet computer), David opens an audio book application, connects to server device 106, and selects the audio book.

When David selects the audio book, the application downloads portions, of the audio book, from the server device to play one hour of the audio book. In addition, the application attempts to download an experience log associated with the audio book. When the application does not find an experience log, the application generates a new experience log, with no entries/records.

David listens to the first 10 minutes of the audio book. While listening, the application records (e.g., locally or at server device 106) that the head phone is worn by David (e.g., indicating engagement level of 5) and the volume is set to a medium level (e.g., indicating engagement level of 4). Thereafter, when David fast forwards 5 minutes worth of material, the application records that David's engagement level for the audio book material from 10 minute mark to 15 minute mark is zero. David listens to 5 more minutes, and then closes the audio book. The application updates the experience log.

Several days later, David re-opens the audio book, and the application begins to play the audio book starting at the location/position that David last accessed. David views the experience log bar, and realizes that he has skipped over 5 minutes worth of material.

David rewinds to the skipped portion and continues to listen. The application continues to record David's levels of engagement and to update the experience log.

CONCLUSION

As described above, when a user accesses a content item (e.g., listens to an audio book, reads an e-book, etc.), a system may generate an experience log to aid the user in establishing the user's orientation/location within the content item. When the user becomes lost, the use may use the experience log to reorient oneself within the content item.

The foregoing description of implementations provides illustration, but is not intended to be exhaustive or to limit the implementations to the precise form disclosed. Modifications and variations are possible in light of the above teachings or may be acquired from practice of the teachings.

In this specification, while series of blocks have been described with regard to different processes, the order of the blocks in the processes may be modified in other implementations. In addition, non-dependent blocks may represent blocks that can be performed in parallel. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. An electronic device, comprising:
   a memory to store executable instructions;
   a processor to execute the instructions and, by execution of the instructions, the electronic device:
     plays back a content item, the content item having a media playback timeline;
     during the playback of the content item, conducts a first monitoring, the first monitoring monitors a first input indicative of user engagement with the content item, the first input being a user interface that receives user input related to control of the playback, the first monitoring identifying changes in the control of the playback where each change in the control of the playback corresponds to a point in time on the playback timeline;
     determines a first level of user engagement with the content item over the playback timeline based on the user input related to control of the playback;
     during the playback of the content item, conducts a second monitoring, the second monitoring monitors a second input indicative of user engagement with the content, the second input different from the user input related to the control of the playback, the second monitoring identifying changes in the second input where each change in the second input corresponds to a point in time on the playback timeline;
     determines a second level of user engagement with the content item over the playback timeline based on the second input;
     determines a third level of user engagement with the content item over the playback timeline by temporally matching and combining the first level of user engagement over the playback timeline with the second level of user engagement over the playback timeline, the third level of user engagement changing for each change in the control of the playback and each change in the second input at the corresponding points in time; and
     creates and displays a graphical timeline to the user of the electronic device of the third level of user engagement, the graphical timeline of user engagement relative in time to the media playback timeline and showing a dynamic level of user engagement with the content item over time representing the third level of user engagement.

2. The electronic device of claim 1, wherein the second user input is a volume control.

3. The electronic device of claim 1, wherein the second user input monitors eye gaze of the user.

4. The electronic device of claim 1, wherein the second user input monitors usage of headphones or earbuds by the user.

5. The electronic device of claim 1, wherein the second user input monitors touching of a display screen.

6. The electronic device of claim 1, wherein monitoring the first user input includes determining a number of times the user controls playback or display of a segment of the content item.

7. The electronic device of claim 1, wherein the media playback timeline is separately displayed from the timeline of user engagement.

8. A method carried out by an electronic device, the method comprising:
   playing back a content item, the content item having a media playback timeline;
   during the playback of the content item, monitoring a first input indicative of user engagement with the content item by a first monitoring, the first input being a user interface that receives user input related to control of the playback, the first monitoring identifying changes in the control of the playback where each change in the control of the playback corresponds to a point in time on the playback timeline;
   determining a first level of user engagement with the content item over the playback timeline based on the user input related to control of the playback;
   during the playback of the content item, monitoring a second input indicative of user engagement with the content by a second monitoring, the second input different from the user input related to the control of the playback, the second monitoring identifying changes in the second input where each change in the second input corresponds to a point in time on the playback timeline;
   determining a second level of user engagement with the content item over the playback timeline based on the second input;
   determining a third level of user engagement with the content item over the playback timeline by temporally matching and combining the first level of user engagement over the playback timeline with the second level of user engagement over the playback timeline, the third level of user engagement changing for each change in the control of the playback and each change in the second input at the corresponding points in time; and
   creating and displaying a graphical timeline to the user of the electronic device of the third level of user engagement with the content item, the graphical timeline of user engagement relative in time to the media playback timeline and showing a dynamic level of user engagement with the content item over time representing the third level of user engagement.

9. The method of claim 8, wherein the second user input is a volume control.

10. The method of claim 8, wherein the second user input monitors eye gaze of the user.

11. The method of claim 8, wherein the second user input monitors usage of headphones or earbuds by the user.

12. The method of claim 8, wherein the second user input monitors touching of a display screen.

13. The method of claim 8, wherein monitoring the first user input includes determining a number of times the user controls playback or display of a segment of the content item.

14. The method of claim 8, wherein the media playback timeline is separately displayed from the timeline of user engagement.

* * * * *